United States Patent [19]

Di Paola

[11] 3,897,289
[45] July 29, 1975

[54] METHOD OF FORMING WIRE WOVEN FABRIC FOR PNEUMATIC TIRES

[75] Inventor: Samuel J. Di Paola, Burton, Ohio

[73] Assignee: The Goodyear Tire & Rubber Company, Akron, Ohio

[22] Filed: May 22, 1972

[21] Appl. No.: 255,840

Related U.S. Application Data

[62] Division of Ser. No. 69,195, Sept. 3, 1970.

[52] U.S. Cl. ............... 156/88; 139/425 R; 156/124; 156/148; 156/250; 156/278; 156/299; 245/10; 428/256; 428/157
[51] Int. Cl. ............................................. D03d 47/50
[58] Field of Search ........... 156/148, 166, 176, 177, 156/299, 88, 250, 278, 269, 134, 174, 133, 124; 161/86, 88, 89, 78, 149, 167, 50, 69, 71, 98, 145, 118; 57/164, 165, 167, 156; 28/73, 1 CS; 139/407, 425 R; 245/10

[56] References Cited
UNITED STATES PATENTS

| | | | |
|---|---|---|---|
| 265,302 | 11/1882 | Brigham | 161/86 |
| 2,019,700 | 11/1935 | Gyatt | 161/78 |
| 2,168,013 | 8/1939 | Winch | 161/86 |
| 2,659,958 | 11/1953 | Johnson | 161/86 |
| 2,766,504 | 10/1956 | Beeby | 28/1 CS |
| 2,840,117 | 6/1958 | Scruggs | 161/86 |
| 3,061,907 | 11/1962 | Nicholl | 28/73 |
| 3,076,252 | 2/1963 | Hofmann | 28/73 |
| 3,087,699 | 4/1963 | Foster | 161/89 |
| 3,104,191 | 9/1963 | Hicks Jr. et al | 156/174 |
| 3,216,677 | 11/1965 | Hofmann | 245/10 |
| 3,391,042 | 7/1968 | Schimpf | 156/174 |
| 3,597,300 | 8/1971 | Miller | 161/86 |
| 3,700,527 | 10/1972 | Grosh | 156/174 |

*Primary Examiner*—Charles E. Van Horn
*Assistant Examiner*—F. Frisenda, Jr.
*Attorney, Agent, or Firm*—F. W. Brunner; H. E. Hummer

[57] ABSTRACT

A fabric for reinforcing pneumatic tires conventionally woven from metal warp cords composed of individual wires or filaments having a diameter greater than 0.003 inches, and weft cords composed of non-metallic material. A tabby, preferably composed of square woven textile cord fabric, is cemented along the leading and trailing edges of the wire cord fabric for maintaining the width of the wire cord fabric uniform throughout its length.

10 Claims, 2 Drawing Figures

METHOD OF FORMING WIRE WOVEN FABRIC FOR PNEUMATIC TIRES

This application is a division of copending application Ser. No. 69,195, filed Sept. 3, 1970.

BACKGROUND OF THE INVENTION

Cords composed of metal, such as bronze or brass-coated steel wire, are in greater demand for reinforcing pneumatic tires. The metal cords must be coated with rubber material and formed into sheets for easy handling and building of the tire on conventional tire building drums. This is generally accomplished by taking the required number of cords from a standard creel with spools of wire, and moving the cords in predetermined parallel relation while compressing rubber material around and between the adjacent cords forming a continuous sheet of rubber material with reinforcing cords.

This particular method of forming tire cord fabric is fine, because no pick threads are utilized. However, many types of tires are built, requiring wire fabric having different end counts, i.e. wire cords per inch of width of the fabric. This means there must be a machine for making every fabric with a different end count, or a machine must be continually shut down and reorganized to produce the desired fabric. In such cases, the number of spools of wire in the creel must be changed, after which the added or subtracted wire cords must be threaded or removed from the machine, and the spacings between the wires adjusted to obtain the required end count of wire cords. This operation is costly and time consuming.

The invention is directed to forming a wire woven fabric similar to the fabrics woven from textile cords. Thus, more conventional calendering methods can then be used to coat differently woven fabrics with rubber material used in the production of pneumatic tires.

Briefly stated, the invention is in a wire woven fabric and method for forming the fabric. The fabric is woven from metal warp cords composed of individual wires or filaments having a diameter greater than 0.003 inches. Weft cords composed of textile material are disposed in interwoven relation with the metal warp cords. In another aspect of the invention, a tabby, as hereinafter defined, is secured to the wire woven fabric adjacent its leading and trailing edges, i.e. the edges being the first and last to pass between conventional calendering rollers for coating the wire woven fabric with rubber material used in the production of tires.

DESCRIPTION OF THE DRAWING

The following description of the invention will be better understood by having reference to the annexed drawing, wherein.

DESCRIPTION OF THE INVENTION

Figure 1:
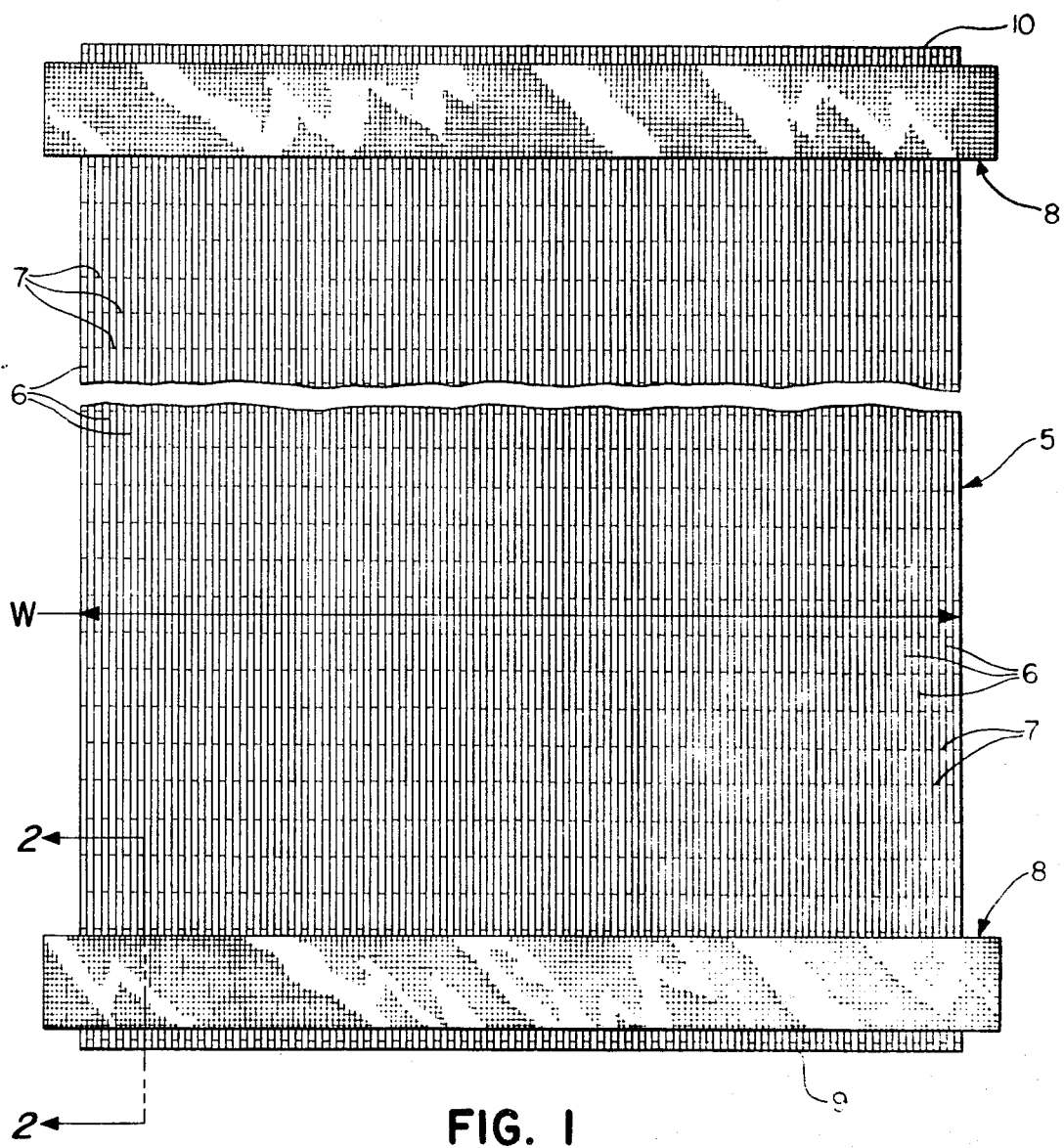
FIG. 1 is a plan view of a section of woven fabric made in accordance with the invention.
Figure 2:
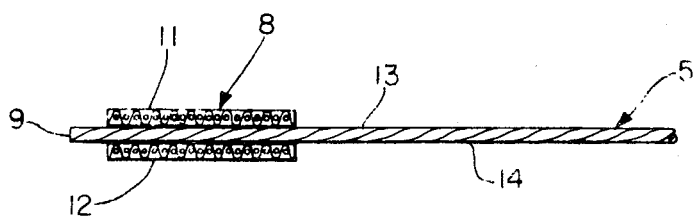
FIG. 2 is a section viewed from the line 2—2 of FIG. 1.

Referring more particularly to the drawing, there is shown a fabric, generally indicated at 5, used in the production of pneumatic tires. The fabric 5 comprises a number of similar warp cords 6 composed of any suitable metal, e.g. high carbon steel wire coated with either zinc or brass and having an elongation at break of about 2 percent. The metal warp cords 6 are each composed of individual wires or filaments having a diameter greater than 0.003 inches. Moreover, the diameter of the individual wire filaments is preferably not greater than about 0.015 inches, and is in the narrower preferred range of from about 0.005 inches to about 0.012 inches. The overall gauge or diameter of each of the metal warp cords 6 is preferably in the range of from about 0.01 inches to about 0.05 inches. For example, a conventionally designated 7 × 3 cord composed of individual wire filaments having a diameter of about 0.0059 inches, has an overall gauge of about 0.036 inches.

A number of similar weft or pick threads 7 are conventionally interwoven with the metal warp cords 6 to maintain the cords in parallel relation, until they pass through a standard calendering machine, where the fabric 5 is coated with elastomeric material, e.g. any natural or synthetic rubber. The weft threads 7 are composed of any suitable fibrous material having a breaking strength of from about 1½ to about 4 pounds, and an elongation at break of from about 20 to about 45 percent. The size of the non-metallic weft thread depends on the corresponding size of the metal warp cord.

A polyester monofilament having a denier in the range of from about 200 to about 300, or a nylon multifilament having a denier in the range of from about 200 to about 400, is preferably used as a weft thread or cord 7. The nylon weft threads 7, when used, were given a twist in either an S or Z direction of from about 1½ to 2 turns per inch of thread length. Moreover, it was found beneficial to use three pick threads per inch length of fabric. Polyester monofilament weft threads were selected for use with metal warp cords 6 having a gauge less than about 0.03 inches, since the monofilament weft threads tend to crimp, causing the metal warp cords 6 to settle in the troughs formed by the crimping, thereby maintaining the warp cords 6 in better spaced relation. The smaller sized metal warp cords 6 mentioned above, tend to slide over the nylon multifilaments causing bunching of the cords, which is detrimental to calendering and coating the fabric with rubber.

The fabric 5 is woven in a conventional loom used to weave tire cord fabric from textile warp cords and weft threads. The metal warp cords 6, as they leave the creel, are preferably tensioned at about 1 to 2 pounds to eliminate slack in the cords during weaving.

A tabby 8 is disposed adjacent the leading and trailing edges 9 and 10 of the finished woven fabric 5. The leading and trailing edges 9 and 10 of the fabric 5, are the longitudinal endings of each roll of woven fabric 5, which are the first and last to pass through opposing calendering rollers used to compress rubber material to the woven fabric 5, thereby forming a sheet of rubberized fabric which is generally stored for later use in building an uncured tire carcass suitable for placing in a mold and vulcanizing. The tabby 8 is composed of any suitable stiffening material, e.g. fused plastic or textile cord fabric, which is secured to the fabric 5 adjacent its leading and trailing edges 9 and 10, and acts to maintain the width of the fabric at these points in uniform corresponding relation with the width of the fabric intermediate the leading and trailing edges 9 and 10. Normally, a greater number of weft threads are interwoven with the warp cords to reinforce and stabilize the leading and trailing edges of tire cord fabric woven from textile material. This arrangement was found unsuitable for fabric with metal warp cords, however, since the increased number of weft threads drew or pulled in the lateral edges of the fabric, thereby distorting the fabric adjacent its leading and trailing edges and making the ends unsuitable for use in building tires.

The tabby 8 preferably comprises two strips 11 and 12 of woven fabric which are cemented in opposing relation on either side 13 and 14 of the wire woven fabric 5. The tabby 8 extends laterally across the woven fabric 5 and is coextensive with the width W of the wire woven fabric 5. The tabby strips 11 and 12 selected for this purpose, were square woven from warp cords and weft threads composed of any suitable textile material, e.g. cotton or rayon. The warp cords of the strips 11 and 12 are disposed at right angles to the warp cords 6 of the fabric 5. Any suitable epoxy or other adhesive can be used to cement the strips 11 and 12 of square woven material adjacent the leading and trailing edges 9 and 10 of the wire woven fabric 5. A single wider strip can be used in place of two narrower strips. For example, a single strip having a width of about 6 inches can be cemented to one of the sides 13 or 14 of the wire woven fabric 5 in place of two 3-inch strips cemented on opposing sides 13 and 14 of the wire woven fabric 5. The cement is dried by any suitable means, e.g. infrared radiation from infra-red lamps suitable for curing the cement in a short period of time, e.g. four minutes. Care should be taken not to overcure the tabby 8, since it will become brittle and break. The tabby 8 maintains the wire woven fabric 5 at a fixed width W throughout its entire length. Otherwise, the longitudinal ends 9 and 10 would reduce in width, such that valuable wire woven fabric 5 would be lost and unsuitable for calendering and building tire carcasses.

The tabbies 8 are positioned on the wire woven fabric 5 during the weaving process. For example, when a sufficient amount of fabric is woven for placing in a roll, the loom is stopped. A pair of tabbies are cemented in spaced lateral relation across the fabric 5. The fabric 5 is then cut between the tabbies. In this way, a tabby 8 is secured adjacent the leading and trailing edges 9 and 10 of the fabric 5.

The finished wire woven fabric 5, with the tabby 8 is passed through a conventional calendering machine used to coat the fabric with rubber. The rubber coated fabric is cut into pieces and cord-oriented, i.e. pieced together such that the warp cords are at a predetermined angle to the longitudinal axis of the sheet of rubberized metal fabric 5. The rubberized metal fabric, with properly oriented cords, is then used to build tire carcasses suitable for curing.

Thus, there has been provided a fabric woven from wire cords and textile material, after which tabbies are placed transversely across the fabric adjacent the leading and trailing edges of the fabric to maintain a uniform width throughout the woven fabric. The finished fabric can then be passed through a conventional calender for coating the fabric with rubber.

While certain representative embodiments and details have been shown for the purpose of illustrating the invention, it will be apparent to those skilled in the art that various changes and modifications may be made therein without departing from the spirit or scope of the invention.

What is claimed is:

1. A method of forming a length of tire cord fabric having parallel longitudinal sides and opposing ends, comprising:
   a. plain weaving together metal warp cords composed of individual wires having a diameter greater than 0.003 inches, and textile weft threads having a denier of at least 200, such that the metal warp cords extend longitudinally of the fabric; and
   b. securing at least one separate piece of stiffening material transversely across the metal warp cords adjacent each of the opposing ends of the fabric, the material composed of plain woven textile warp cords and weft threads, the pieces of stiffening material being secured to the fabric such that the textile warp cords are angularly disposed to the metal warp cords.

2. The method of claim 1, wherein the stiffening material includes textile warp cords which are normal to the metal warp cords and coextensive with the width of the fabric.

3. The method of claim 2, wherein the textile warp cords are composed of material selected from the group consisting of cotton and rayon.

4. The method of claim 3, which includes securing at least two strips of plain woven material in spaced relation laterally across the fabric, and cutting the fabric transversely between the strips.

5. The method of claim 4, which includes sandwiching the fabric between two pieces of stiffening material adjacent each of the opposing longitudinal endings of the fabric.

6. The method of claim 5, which includes calendering the fabric and pieces of stiffening material with rubber material to form metal reinforced rubber stock for fabricating tires.

7. The method of claim 6, which includes cutting the pieces of stiffening material from the remainder of the metal reinforced rubber stock, prior to using said stock in tires.

8. The method of claim 7, which includes using at least one layer of said stock in forming a tire carcass.

9. The method of claim 7, which includes using at least one layer of said stock in forming a belt for annularly reinforcing a tire.

10. The method of claim 9, which includes using said stock in building a radial tire.

* * * * *